Patented Mar. 29, 1949

2,465,969

UNITED STATES PATENT OFFICE 2,465,969

PURIFICATION OF A FATTY OIL

Jakob L. Jakobsen, Minneapolis, Minn., assignor to General Mills, Inc., a corporation of Delaware No Drawing. Application April 20, 1946, Serial No. 663,761

2 Claims. (Cl. 260—428)

The present invention relates to the treatment of soybean oil and is particularly concerned with the improvement of quality and flavor stability of such soybean oil.

It has been well recognized that edible soybean oil is distinctly subject to flavor instability, and after short periods of time, particularly when exposed to air and light or when subjected to heat, it develops off-flavors and the oil is said to have "reverted." This "reversion" is characterized by the development of off-flavors, often described as "grassy" or "fishy." Although the off-flavors developed by the "reverted" soybean oil are not characteristic of the oil, either in its crude form or in its refined form, the term "reverted" has been generally adopted to indicate the characteristic off-flavors developed in soybean oil when exposed to light and air, and is used herein to indicate such changes in the oil.

Various attempts have been made to overcome this objection to soybean oil. These, however, have not been notably successful, and the problem of developing a stable non-reverting soybean oil had not been satisfactorily solved up to the time of the present invention.

It has now been discovered that by processing soybean oil in a certain manner, the tendency for reversion can be reduced very substantially, and may even be practically eliminated.

It is, therefore, an object of the present invention to provide a process of flavor stabilizing soybean oil.

Another object of the present invention is to provide a flavor stable soybean oil product.

These and other objects of the invention will be more fully apparent from the following description of the invention, with particular reference to the specific examples which are to be considered as illustrative only and not as limiting the invention.

In general, the invention involves the discovery that soybean oil processed in accordance with a definite sequence of operations is more flavor stable and much less likely to develop off-flavors than is soybean oil processed according to conventional present-day procedure. Broadly, the sequence of steps to which the soybean oil is subjected includes the following: degumming or desludging; alkali refining; heat stabilization; hydrogenation (this step is optional); alkali refining and deodorization.

Crude soybean oil, which may be solvent-extracted oil, expeller oil, hydraulic pressed oil, or any other suitable crude soybean oil, is first subjected to a degumming or desludging operation.

This operation involves the precipitation of lecithin and other mucilaginous materials and also the removal of various metallic impurities. Where it is desired to recover the lecithin, this degumming or desludging operation may be separated into two steps; first, the precipitation and separation of lecithin, and second, the removal of the metallic impurities. The precipitation of lecithin may be performed in a conventional manner, such, for example, as by the addition of small quantities of water, salt solution, weak acids, and the like, which are conventionally used for the precipitation of lecithin. The precipitated lecithin may then be separated from the oil and recovered. The separated oil may then be treated with a small amount (½ to 2%) of a strong acid, such as hydrochloric acid. This serves to dissolve a very large proportion of the various metallic ions, such as iron, aluminum, magnesium, and calcium, some of which are detrimental to the stability of the product. Water is then added to the mixture to dilute the acid and stop further reaction. The water is also of assistance in effecting a phase separation of the acid and oil. The aqueous phase containing the dissolved metallic compounds may be then removed by settling or other means, and the oil then subjected to the next step in the operation. Instead of diluting the acid with water, it is also possible to neutralize the acid by any suitable means such, for example, as alkaline compounds or solutions thereof.

Where it is not desired to recover the lecithin, the entire operation can be accomplished in a single step by the direct addition of the strong acid to the crude oil which results in the precipitation of lecithin and the removal of the metallic impurities all at the same time. This treatment has an adverse effect on the lecithin, however, and it is no longer recoverable in any satisfactory commercial form.

In place of the hydrochloric acid, other acids may be used, such as nitric, phosphoric, boric, and sulfuric. All these acids, with the exception of sulfuric, are preferably used in concentrated form. In this form, the acids are more readily distributed throughout the oil and can conveniently be brought into intimate contact with the oil. It is possible, however, to use less concentrated acids, but these usually necessitate more efficient agitation for distribution in the oil. In view of the possibility of sulfonation reactions with concentrated sulfuric acid, it is preferred to use this acid in a somewhat dilute form, as for example, 10% $H_2SO_4$. Aqueous solutions of acid reacting salts, such as alum, aluminum sulfate, aluminum chloride, salt cake and the like may also be used for the removal of metallic impurities.

Various organic acids may also be used. Suitable acids include oxalic, citric, tartaric, maleic, adipic, fumaric, malonic, phthalic, acetic, formic, butyric, benzoic. Polybasic acids, especially the di- and tri-basic acids and their hydroxylated derivatives are preferred. Of the monobasic organic acids, those having a low molecular weight are preferred. The various organic acids may be used in a solid or liquid state in which the free acid exists or they may be employed as aqueous solutions. Many of these organic acids are instrumental in removing iron and other metallic impurities from the oil. Others are useful primarily in precipitating phosphatides and other mucilaginous materials.

Instead of relying on an acid or acid salt to remove iron and other metallic impurities, it is possible to remove these metals by means of adsorbents such as bleaching earths and the like. In such an event, the oil would be degummed by means of water, weak acids, or salt solutions, then alkali refined and then treated with a suitable adsorbent prior to the heat stabilization step. It is also possible to treat the degummed oil with the adsorbent and then alkali refine.

The alkali refining operation may be done in any conventional manner. It may be batch or continuous, and may employ any of the usual alkaline refining agents, such as sodium or potassium, hydroxide, carbonates, phosphates, and the like. In alkali refining the free fatty acids are precipitated as soaps and are removed either by centrifuging or settling. The refined oil may then be washed and dried.

The heat stabilization of the oil is performed in a vacuum kettle at a temperature of 230–300° C., preferably 255–260° C. The time period may vary from an hour to an hour and one half. During the treatment, a small amount of inert gas, preferably a condensable gas such as steam or carbon dioxide, is employed. It is also possible to employ an inert non-condensable gas such as nitrogen and hydrogen, but these are less advantageous, both from the standpoint of cost and from the operational standpoint, since they require the use of larger capacity vacuum equipment. It is important that the inert gas employed be substantially free from oxygen. It has been found that it is essential to avoid any tendency toward oxidation throughout processing wherever a high temperature is employed. This is particularly true in the heat stabilization step which involves the highest temperature treatment of the process. It is preferred to employ de-aerated steam (for example, steam generated from thoroughly boiled water). The purpose of the inert gas is largely to keep the oil agitated and uniformly heated. To some extent it also carries away some of the odoriferous matter in the oil. It is desired to point out that this step is not a deodorization step. Temperatures employed are far in excess of those employed for deodorization, and the time period is much shorter than that employed in deodorization. Furthermore, the amount of inert gas employed is materially less than that employed during deodorization, and may amount to only 10% of that employed during deodorization.

After the heat stabilization, the oil may be hydrogenated or not, depending upon whether a solid or liquid product is desired. If the product is to be hydrogenated, it is cooled to about room temperature, and then is transferred to the hydrogenating kettle where it is subjected to any suitable conventional hydrogenation procedure.

The heat stabilization step, particularly when steam is employed as the inert gas, results in a very slight hydrolysis of the fat, such that the product possesses an acid number higher than that desired in the final product. Accordingly, it is preferred to subject the oil, after the heat stabilization step, to the alkali refining step but with only a slight amount of alkali. If the oil is to be hydrogenated, the hydrogenation step is preferably carried out prior to the second alkali refining, since this alkali refining assists in the removal of the small amount of catalyst which is retained in the hydrogenated oil. The alkali refining does not result in a very large precipitated soap and accordingly it is preferred to remove the small amount of soap precipitated by filtering the oil through a filter aid. For this purpose bleaching earth is preferred, although other materials such as diatomaceous earth may be employed.

The final step in the process is the deodorization. For this purpose we prefer a relatively low temperature, preferably 185° C. for a period of about three hours, followed by a further treatment at 125° C. for two hours. The upper temperature may vary within the range 180° C. to 190° C. and the lower temperature may vary within the range 120° C. to 130° C. During the deodorization, the material is subjected to a vacuum of the order ordinarily employed in this operation, and is likewise subjected to a treatment with an inert gas such as steam, carbon dioxide, nitrogen, or hydrogen. Here again, it is important that the inert gas be oxygen free.

Following deodorization, the product is cooled and packaged. If the oil has been hydrogenated, it should be subjected to a texturizing step in accordance with well-known procedure prior to packaging.

It is also possible under certain circumstances, to alter the previously described processing to omit the first alkali refining. Thus, for example, where an oil is employed having a low acid number or containing a small amount of phosphatides and coloring matter, it is possible to employ a single alkali refining just prior to final deodorization. It is essential, however, in such cases to effect a rather thorough degumming or desludging. It is also essential to thoroughly remove any strong acid such as hydrochloric acid since such acid might have an adverse effect on the oil during the high temperature treatment. A thorough water washing is satisfactory to effect such acid removal.

The following example serves to illustrate the invention.

*Example*

Crude solvent extracted soybean oil was degummed by being treated with 1% by weight of concentrated hydrochloric acid at room temperature. The mixture was then stirred for about a half hour, after which an amount of water in the proportion of about 10 parts of water to 1 part of hydrochloric acid, was added to the mixture. This mixture was then stirred for about 15 minutes and then allowed to stand overnight at room temperature. As a result of this treatment, the gums were precipitated and settled to the bottom of the vessel. The supernatant oil was then decanted from the gum. The separated oil was then washed three times with 10% of water at a temperature of 75–80° C.

The degummed oil was then subjected to alkali refining using 2% of a 20° Bé. solution of sodium hydroxide. The resultant mixture was stirred and warmed until a break was obtained after which the resultant soapstock was allowed to settle and clear oil was decanted. The neutralized oil was then subjected to heat treatment at a temperature of 225–260° C. for a period of 1–1½ hours while under vacuum (2–5 mm.). During this treatment small amounts of steam generated from de-aerated water were blown through the oil. The amount of steam employed was approximately 5% of the oil, by weight. After the heat treatment, the oil was cooled out of contact with the air. The heat treating process in the presence of steam resulted in a slight amount of splitting of the fat so that the resultant oil contained a small quantity of free fatty acids. In order to remove these free fatty acids, the oil was then treated with a small amount of alkali (1% of a 20° Bé. sodium hydroxide solution) and the resultant soap was removed by filtering the oil through small quantities of bleaching earth.

After this step, the oil was deodorized for about three hours at about 185° C. while maintaining the usual deodorizer vacuum. During this treatment, steam from de-aerated water was passed through the oil. At the end of the three hour period, the temperature was reduced to 125° C. and the process continued at that temperature for two hours. Following the deodorization, the oil was cooled out of contact with the air and was transferred to packages. Samples prepared as above and stored at room temperature in partial darkness were found to be free from reversion even after 6 months, while samples processed in conventional ways were found to have reverted after 2–3 weeks storage under the same conditions.

The above description points out the manner in which the present invention is carried out. It will be appreciated that slight variations from the stated conditions may be employed without departing from the spirit of the invention.

It is desired to stress the importance of avoiding oxidation during any of the high-temperature operations, such as the heat treatment, hydrogenation, and deodorization. It is necessary that special precautions be taken to insure oxygen-free steam. Thus in conventional steam generating equipment, it will be found that steam is not oxygen free even after the air in the system has been flushed out by discharging steam to atmosphere. The incoming fresh water introduces additional oxygen and even where condensed steam is returned to the boiler, the usual boiler feed pump will introduce air unless special precautions are taken in the form of special packing glands and the like, to prevent the introduction of air. With these precautions, it is possible to produce oxygen-free steam, and thus to maintain oxygen-free conditions during these high temperature treatments.

It should be pointed out further that after the oil has been desludged, precautions should be taken to prevent recontamination from metals. This is particularly important in the heat treatment step and in the deodorization step. In the former step, the small amount of free fatty acids liberated would, at the elevated temperature, attack an ordinary iron or steel kettle and form iron soaps which are strong positive oxidation catalysts and accordingly detrimental to the final product.

It will be seen from the above description, that the present invention provides a novel process of producing soybean oil possessing flavor stability. In general the soybean oils produced according to the present invention are quite stable to air and light. They remain in good condition for months when exposed at room temperature in colorless bottles to daylight.

While various embodiments of the invention have been discovered, it is to be understood that the invention is not limited thereto, and may be varied within the scope of the following claims.

I claim as my invention:

1. In the purification of a fatty oil selected from the group consisting of degummed soybean oil and degummed and alkali refined soybean oil, the step of heat stabilizing said oil, comprising subjecting the oil for approximately one hour to one hour and one-half to a temperature within the approximate range of 230–300° C., under vacuum, while blowing a substantially oxygen-free inert gas through the oil, the amount of gas being a small fraction of the weight of the oil.

2. In the purification of a fatty oil selected from the group consisting of degummed soybean oil and degummed and alkali refined soybean oil, the step of heat stabilizing said oil, comprising subjecting the oil for approximately one hour to one hour and one-half to a temperature within the approximate range of 255–260° C., under vacuum, while blowing a substantially oxygen-free inert gas through the oil, the amount of gas being a small fraction of the weight of the oil.

JAKOB L. JAKOBSEN.

REFERENCES CITED

The following references are of record in the file of this patent:

UNITED STATES PATENTS

| Number | Name | Date |
| --- | --- | --- |
| 2,122,260 | Moore et al. | June 28, 1938 |
| 2,190,593 | Clayton | Feb. 13, 1940 |
| 2,209,904 | Ralston et al. | July 30, 1940 |
| 2,357,352 | Paterson | Sept. 5, 1944 |

FOREIGN PATENTS

| Number | Country | Date |
| --- | --- | --- |
| 327,990 | Great Britain | Apr. 14, 1930 |

OTHER REFERENCES

Bailey—Oil & Fat Products, Interscience Pub. (1945), pp. 500–502, 511, 516, 518, 520–21, 535–36.